(12) United States Patent
Adibi et al.

(10) Patent No.: US 7,649,660 B2
(45) Date of Patent: Jan. 19, 2010

(54) HIGH THROUGHPUT HOLOGRAPHIC SPECTROMETER USING THE MULTIPLEXED HOLOGRAM

(75) Inventors: Ali Adibi, Suwanee, GA (US); Chao Ray Hsieh, Atlanta, GA (US); Arash Karbaschi, Smyrna, GA (US); Omid Momtahan, Foothill Ranch, CA (US)

(73) Assignee: Georgia Tech Research Corp., Atlanta, GA (US)

( * ) Notice: Subject to any disclaimer, the term of this patent is extended or adjusted under 35 U.S.C. 154(b) by 459 days.

(21) Appl. No.: 11/459,102

(22) Filed: Jul. 21, 2006

(65) Prior Publication Data
US 2007/0030490 A1    Feb. 8, 2007

Related U.S. Application Data

(60) Provisional application No. 60/701,755, filed on Jul. 22, 2005.

(51) Int. Cl.
*G03H 1/00* (2006.01)
*G02B 5/32* (2006.01)
*G03H 1/26* (2006.01)

(52) U.S. Cl. .................................. 359/15; 359/1; 359/22
(58) Field of Classification Search .................. None
See application file for complete search history.

(56) References Cited

U.S. PATENT DOCUMENTS

| 5,978,112 A | * | 11/1999 | Psaltis et al. | ................. 359/22 |
| 2004/0021871 A1 | * | 2/2004 | Psaltis et al. | ................. 356/451 |
| 2004/0021920 A1 | * | 2/2004 | Psaltis | ......................... 359/15 |

* cited by examiner

*Primary Examiner*—Stephone B Allen
*Assistant Examiner*—Jade R Callaway
(74) *Attorney, Agent, or Firm*—Thomas, Kayden, Horstemeyer & Risley, LLP; Todd Deveau

(57) ABSTRACT

A sophisticated volume hologram for dispersing an incident optical signal with uniform spectrum over an input plane to an output pattern with non-uniform spatial-spectral information, where the sophisticated volume hologram includes a plurality of holograms that map different input wavelengths into different locations on an output plane. The system further includes a detector for receiving and detecting light dispersed by the sophisticated volume hologram.

21 Claims, 8 Drawing Sheets

```
┌─────────────────────────────────────────────┐
│  USE A SOPHISTICATED VOLUME HOLOGRAM TO     │
│  DISPERSE AN INCIDENT OPTICAL SIGNAL WITH   │
│  UNIFORM SPECTRUM OVER AN INPUT PLANE TO    │
│  AN OUTPUT PATTERN WITH NON-UNIFORM         │
│  SPATIAL-SPECTRAL INFORMATION               │
│                                        1110 │
└─────────────────────────────────────────────┘
                       │
                       ▼
┌─────────────────────────────────────────────┐
│  RECEIVE AND DETECT LIGHT DISPERSED BY      │
│  THE SOPHISTICATED VOLUME HOLOGRAM          │
│                                        1120 │
└─────────────────────────────────────────────┘
                       │
                       ▼
┌─────────────────────────────────────────────┐
│  DETERMINE A SPECTRUM OF THE INCIDENT       │
│  OPTICAL SIGNAL BY USING POST PROCESSING    │
│                                        1130 │
└─────────────────────────────────────────────┘
```

FIGURE 11

HIGH THROUGHPUT HOLOGRAPHIC SPECTROMETER USING THE MULTIPLEXED HOLOGRAM

CROSS-REFERENCE TO RELATED APPLICATION

This application claims priority to U.S. provisional application entitled, "High Throughput Volume Holographic Spectrometer Using Holographic Multiplexing Techniques for Diffuse Source Spectroscopy," having Ser. No. 60/701,755, filed Jul. 22, 2005, which is entirely incorporated herein by reference.

STATEMENT REGARDING FEDERALLY SPONSORED RESEARCH OR DEVELOPMENT

This invention was made with Government support under Grant No. N01AA23013, awarded by the National Institutes of Health. The Government has certain rights in this invention.

TECHNICAL FIELD

The present disclosure is generally related to optical spectrum measurements and, more particularly, is related to spectrometers.

BACKGROUND

Compact and efficient spectrometers are essential for biological and environmental sensing applications in which optical signals of interest are usually very weak and portability is highly desired.

A key element of a spectrometer is a wavelength sensitive (or dispersive) device that allows for separation of different wavelength channels for detection. Holograms (or gratings) are well-known candidates for this task due to their wavelength selectivity, which results in non-uniform diffraction of different wavelength channels of a collimated optical beam. Most of the optical spectrometers built based on this phenomenon exploit surface relief or thin film gratings which primarily have single grating vectors. However, these spectroscopy techniques are not efficient for spatially incoherent light sources.

The reason is that for an incoherent source with uniform spectrum in the input plane of such spectrometers, the output will be an ambiguous pattern with contributions from different wavelength channels overlapping each other. The problem has been solved in conventional spectrometers by limiting the angular range of the incident beam by using spatial filtering. Unfortunately, spatial filtering drastically reduces the photon throughput for diffuse source spectroscopy. While such inefficiency might be tolerated in absorption spectroscopy (where a strong incoherent source can be used), it is a major limitation for weak diffuse sources, such as those generated in Raman spectroscopy. In such cases, the signal from the desired molecules is very weak and successful sensing requires a sensitive and efficient spectrometer.

SUMMARY

Embodiments of the present disclosure provide systems and methods for analyzing an optical spectrum. Briefly described, one embodiment of a system includes a sophisticated volume hologram for dispersing an incident optical signal with uniform spectrum over an input plane to an output pattern with non-uniform spatial-spectral information, where the sophisticated volume hologram includes a plurality of holograms that map different input wavelengths into a diverse spatial pattern. The system further includes a detector for receiving and detecting light dispersed by the sophisticated volume hologram.

Embodiments of the present disclosure can also be viewed as providing methods for analyzing an optical spectrum. In this regard, one embodiment of such a method, among others, can be broadly summarized by the following steps: using a sophisticated volume hologram to disperse an incident optical signal with uniform spectrum over an input plane to an output pattern with non-uniform spatial-spectral information, wherein the sophisticated volume hologram comprises a plurality of holograms that map different input wavelengths to diverse spatial patterns in the output pattern; and receiving and detecting light dispersed by the sophisticated volume hologram.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, reference numerals designate corresponding parts throughout the several views.

FIG. 11 is a flow chart depicting one embodiment of a method of analyzing an optical spectrum.

DETAILED DESCRIPTION

An important issue for the performance of a spectrometer is the throughput and its relation to the resolution of the spectrometer. Currently, the best throughput demonstrated by using one single spherical beam volume hologram is around 10%.

In order to design more sensitive spectrometers, multi-mode multiplex spectroscopy (MMS) are considered based on using a weighted projection of multiple wavelength channels (e.g., multimode) of the incident signal. In contrast to conventional spectrometers, the output signal in MMS is composed of multiple wavelength channels, and the information of each channel is separated by post processing of the detected signal. A key element in MMS is a spectral diversity filter (SDF) that inverts an incident optical signal with uniform spectrum over the input plane to an output pattern with non-uniform spatial-spectral information. By measuring the output light intensity over the output plane by a detector array (for example a charge-coupled device, such as a digital camera) and performing an inverse filtering, the input spectrum can be approximated.

Spectral diversity filters have been demonstrated using an inhomogeneous three-dimensional (3D) photonic crystal. Under the photonic crystal approach, the input-output mode volume is fixed, but a spatially structured fraction of diffuse incident light is reflected. While 3D photonic crystals are attractive as super-dispersive elements, they are hard to fabricate based on an arbitrary design. Thus, other (more designable and manufacturable) schemes for the development of SDFs are needed.

In accordance with the present disclosure, spectral diversity filters (SDFs) are constructed using spherical beam volume holograms (SBVHs), in some embodiments. Such holograms may be recorded by the interference pattern between a plane wave and a spherical wave inside a photopolymer material, in one embodiment. During readout of these holograms with a white light source, the information of different wavelength channels of the incident beam have different spatial distributions in the output plane.

Accordingly, a variety of approaches for recording complicated spherical beam holograms are examined. In particular, different holographic multiplexing techniques, such as shift multiplexing, angular multiplexing, and rotation multiplexing, are explored, in the present disclosure.

Embodiments of the present disclosure produce a range of grating vectors in contrast to a plane wave hologram that only has one grating vector. Holograms are recorded using the interference of a spherical beam and a planar beam (also called a plane wave) to obtain the range of grating vectors. In the examples to be discussed, these holograms are read with monochromatic beams with different degrees of collimation (from a collimated beam to a completely diffuse beam) illuminating the hologram in the direction of the spherical recording beam.

I. Shift Multiplexing

Figure 1:
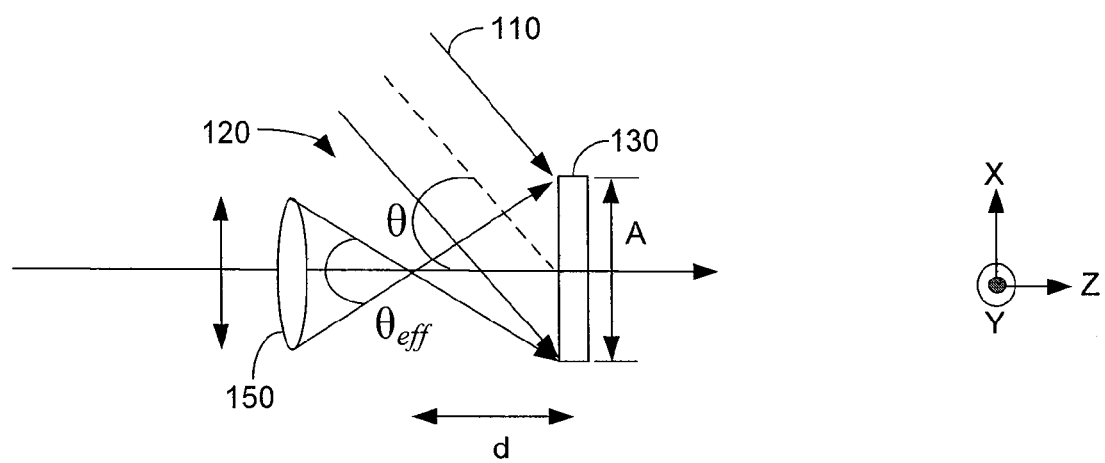
FIG. 1 is a diagram of an exemplary setup for recording shift multiplexed spherical beam holograms in accordance with the present disclosure.

One holographic multiplexing technique, among others, involves shift multiplexing and is illustrated by FIG. 1. Shift multiplexed spherical beam volume holograms may be recorded by one plane wave 110 and one diverging point source 120 (that is produced by a plane wave being passed through lens 150) which shifts its position along the x-direction, as shown in FIG. 1.

In the figure, the angle between the planar recording beam and the normal direction to the recording material 130 (for example, the photopolymer) is $\theta$; the size of the hologram of photopolymer material 130 is A (note that A shown in FIG. 1 refers to the amount in both x-axis and y-axis); the distance between the point source 120 and the photopolymer 130 is d, and the effective diverging angle of the point source 120 with respect to the size of the hologram 130 is $\theta_{\it eff}$. Also, in the present example, the recording photopolymer material is 300 μm-thick Aprilis photopolymer.

Accordingly, in a first demonstration, a three-shift-multiplexed hologram (having three holograms) is recorded by shifting the position of the point source 120 in FIG. 1 along the x-axis by 1 mm increments.

The holograms that are produced are put into a reading system 200 (shown in FIG. 2) for evaluation, where the focal length of the lens 210 is f and a rotating diffuser 220 may be placed in front of the hologram 230 to generate a spatially incoherent optical beam, for some tests. Although the technique is general and can be used with different design parameters, the following parameters of FIG. 1 are repeated in this demonstration: $\theta=35.64°$, $A=0.7$ cm×0.7 cm, $d=3.4$ cm, and $\theta_{\it eff}=11.75°$.

Figure 2:
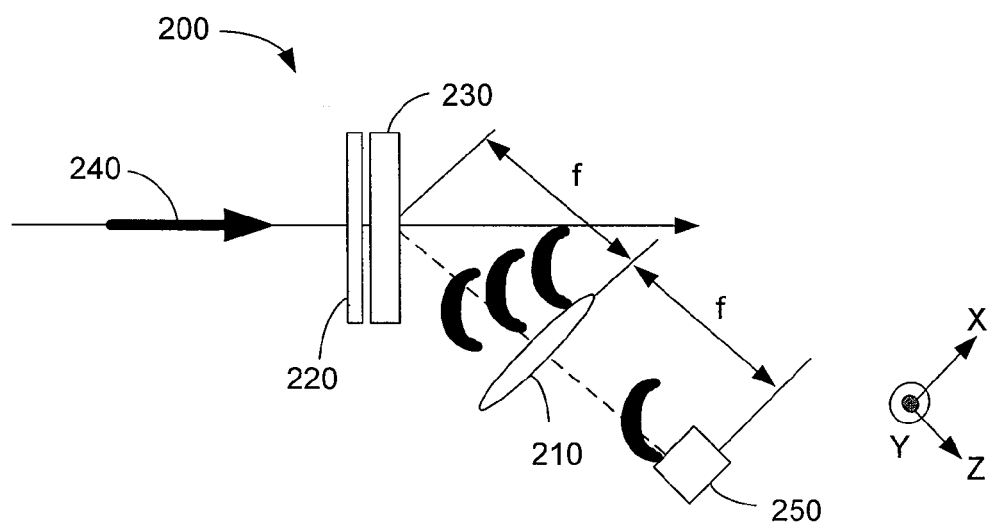
FIG. 2 is a diagram of an exemplary setup for reading and evaluating a hologram, such as that recorded by the setup of FIG. 1.
Figure 3A:
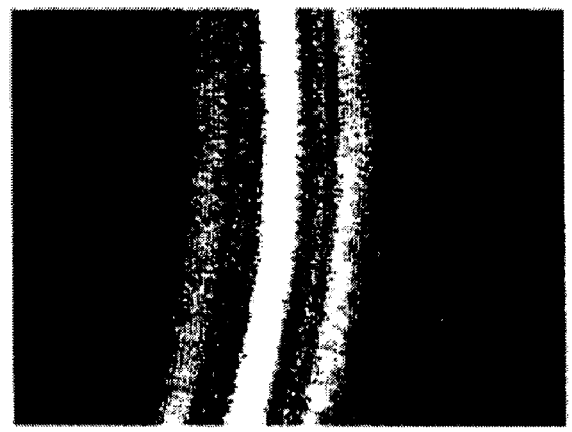
FIG. 3A is diagram of a diffracted signal of a shift-multiplexed hologram right behind the hologram recorded by the setup of FIG. 1.

The holograms are illuminated by a collimated monochromatic light 240 (provided by a monochromator (not shown) with the output slit size of 1 mm with a white light input source) from the direction of the recording point source (mainly associated to the middle one of the multiplexed holograms). The diffracted signal is captured by a charge coupled detector (CCD) 250 either right behind the hologram or at the Fourier plane (e.g., by a CCD 250). The spatial pattern of the diffracted signal behind the holograms 230 has three crescents shape as shown in FIG. 3A, where the diffuser 220 of FIG. 2 is not used.

Each three bright crescents correspond to the three spherical beam holograms and are diffracted from different location at the back surface of the holograms. All three crescents propagate along the same direction since the multiplexed holograms are recorded by the same plane wave reference and are read at the same wavelength.

Figure 3B:
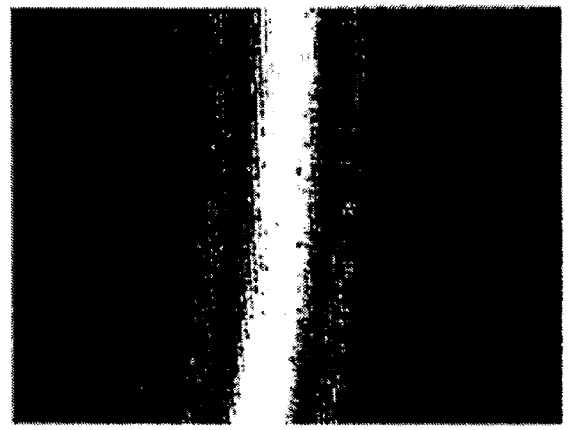
FIG. 3B is diagram of a diffracted signal of a shift-multiplexed hologram at the Fourier plane of the hologram recorded by the setup of FIG. 1.

Therefore, all three crescents can be brought together after a Fourier transformation. As shown in FIG. 3B, even with the presence of the diffuser 220, only one crescent is obtained at the Fourier plane and the intensity of the diffracted signal is the summation of three diffracted crescents. Note that with diffuser 220 present, the diffracted pattern at the back face of the hologram is a diffuse bright pattern duo to the existence of many crescent for each hologram diffracted by the components of the input diffuse beam at different angles. However, the location of all these crescents in the Fourier plane are the same, and only one crescent is observed in the output (Fourier) plane. Note also that there are side lobes on both sides of the crescents due to the spherical hologram. The different brightness of the three crescents in FIG. 3A is due to their different diffraction efficiencies and can be adjusted by optimizing an exposure schedule for the three holograms.

In an additional test, a single spherical beam hologram and a two-shift-multiplexed hologram are recorded under the same recording configuration and condition. The width of the crescent in both cases is then monitored along the x-direction by the use of the experimental setup shown in FIG. 2.

Figure 4A:
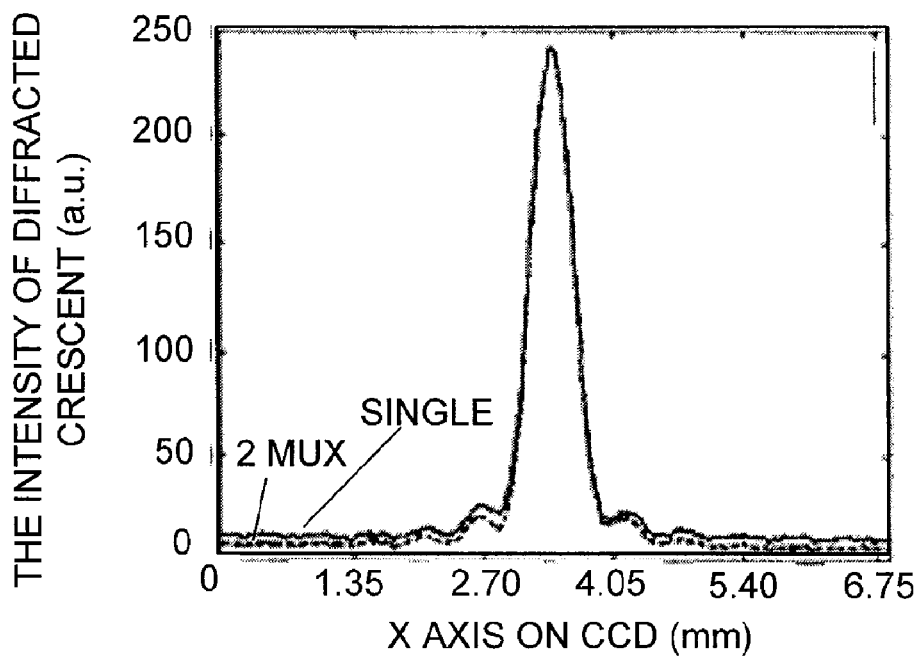
FIGS. 4A-4B are diagrams showing a comparison of a crescent of a single spherical beam hologram and a two-shift-multiplexed spherical beam hologram recorded by the setup of FIG. 1.
Figure 4B:
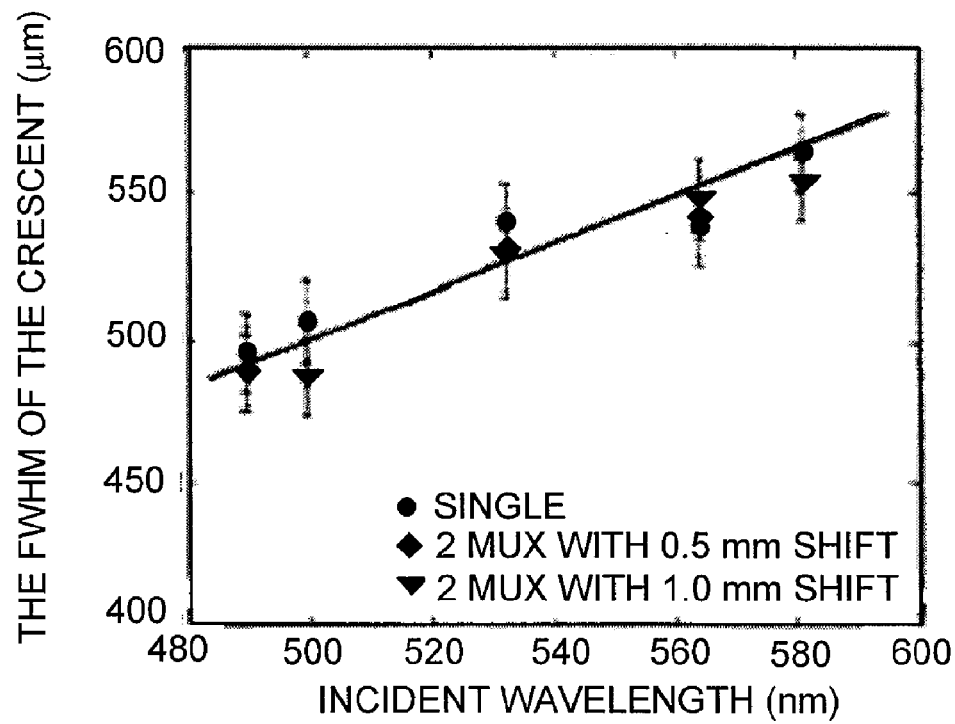

For one reading wavelength at 532 nm, the crescent shapes in the x-direction between single and multiplexed holograms are closely fitted by normalizing the peak intensity in both cases as shown in FIG. 4A. Furthermore, the values of the full width half maximum (FWHM) of the crescent for single and multiplexed holograms are very close over a 90 nm range of reading wavelength (e.g., 490 nm to 580 nm), as shown in FIG. 4B. As a result, FIGS. 4A and 4B clearly indicate that the width of the crescent is not affected by recording shift-multiplexed holograms, and they indicate that the throughput of the spectrometer (e.g., hologram 230 plus CCD 250) can be improved by using shift-multiplexed holograms without deteriorating the resolution.

Assuming the diffraction efficiency of the crescent is proportional to that of the hologram, the throughput improvement factor (F) based on the shift-multiplexed technique can be described as $$F = M\sin^2\left(\frac{M/\#}{M}\right) \quad \text{(Equation 1)}$$

where M is number of multiplexed holograms and M/# is the dynamic range of the recording material.

Equation (1) clearly indicates that F can be optimized by correctly choosing the number of multiplexed holograms for one specific recording material with a fixed value of the dynamic range (e.g., M/#). Based on the material (e.g., 300 µm-thick Aprilis photopolymer, which has the M/#=4.0) used in the example, the optimal improvement factor is 2.85 for recording three-shift-multiplexed holograms. In other words, the total efficiency of the spectrometer can be increased by a factor of 2.85 if three-shift-multiplexed holograms are used instead of a single hologram without sacrificing resolution. This number can be further improved by optimizing materials and recording setup properties.

From the foregoing, it is apparent that shift multiplexing is a valuable technique to increase the total throughput of the Fourier-transform volume holographic spectrometer without loosing the resolution. Further, a considerable improvement may be achieved by using recording material with a large dynamic range.

II. Angular Multiplexing

Angular multiplexing is another holographic multiplexing technique, among others, that may be used to record spherical beam volume holograms to increase the throughput of a spectrometer.

Figure 5:
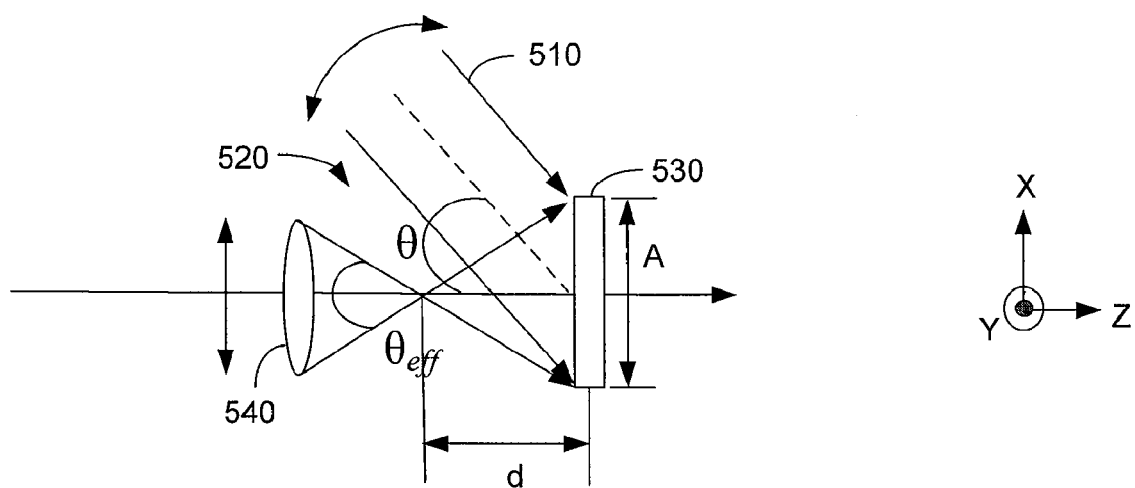
FIG. 5 is a diagram of an exemplary setup for recording angular multiplexed spherical beam holograms in accordance with the present disclosure.

FIG. 5 shows one exemplary setup for recording angular multiplexed spherical beam holograms. In this setup, each hologram is recorded by one plane wave 510 and one diverging spherical beam 520, where the spherical beam is the same for all holograms and the angle of the plane wave is changed for recording different holograms. The parameters shown in the figure have the same definitions as that of FIG. 1. Namely, two holograms are angular multiplexed in the photopolymer material 530 with a 0.4 degree of angular separation of the recording plane waves. Other parameters are $\theta=35.64°$, $A=0.7 \text{ cm} \times 0.7 \text{ cm}$, $d=3.4 \text{ cm}$, and $\theta_{eff}=11.75°$. The holograms are then read by using the same setup as shown in FIG. 2 except the focal length of the lens 540 changes to 3.8 cm.

Because these two holograms are recorded by different angles of the plane waves, the crescents associated to the two holograms are diffracted into different directions and two crescents are obtained at the Fourier plane. In comparison with the single hologram case, the spectral diversity is improved and the throughput is increased. However, the ambiguity is increased as well for this approach. Therefore, inverse post processing is performed to retrieve the spectrum of the unknown input source. This can be achieved in software using the known optimization techniques such as least square optimization, among others.

Note that the width of the crescents is the same as that in the single hologram experiments, which means that the resolution is not sacrificed for the increase in throughput. The optimal number of holograms here depends on the dynamic range of the recording material and can be optimized for each material. The throughput can be further improved by using a diffractive optical element to record all holograms simultaneously. This may also be performed in the shift multiplexing case.

III. Rotation Multiplexing

Figure 6:
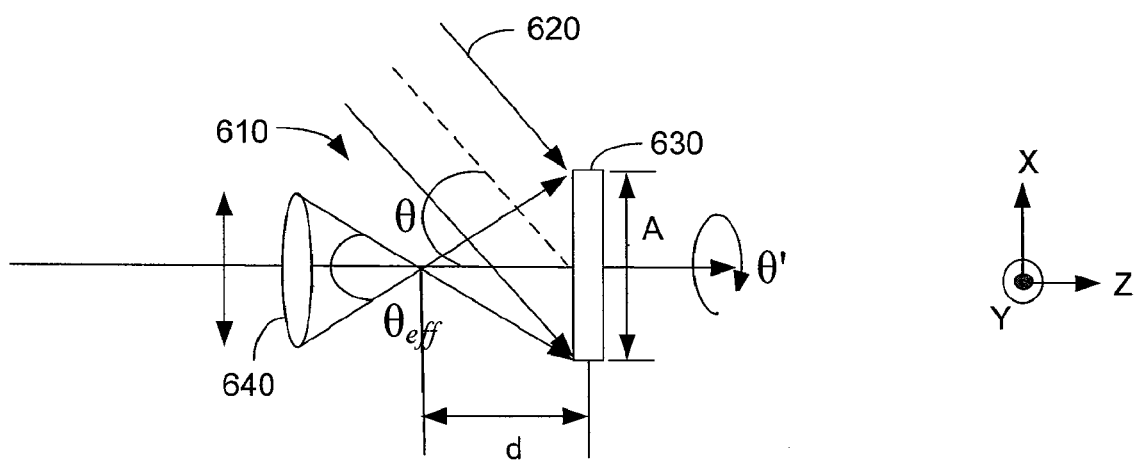
FIG. 6 is a diagram of an exemplary setup for recording rotation multiplexed spherical beam holograms.

Similar to the function of the angular multiplexing technique, the spectral diversity and the throughput of the spectrometer can also be improved by recording rotation multiplexed spherical beam holograms. FIG. 6 shows one exemplary setup for recording rotation multiplexed holograms.

Here, the holograms are recorded by a diverging spherical wave 610 (produced by a plane wave being passed through lens 640) and a plane wave 620. The recording material 630 is then rotated by an angle $\theta'$ before recording the next (adjacent) hologram. The axis of rotation here is perpendicular to the recording material 630 (for example, the photopolymer). This distinguishes the rotation multiplexing from the angular multiplexing. The definitions of all parameters shown in this figure are described in the caption of FIG. 1.

In particular, for the present demonstration, eight rotation-multiplexed holograms are recorded by rotating the photopolymer around the z-direction (the normal direction of the sample) at the separation of $\theta'=45°$ for each hologram. The holograms are then put in the reading system 200 (as shown in FIG. 2) without application or presence of the diffuser 220. Because the diffracted signals of eight holograms go into eight different directions out of the plane and it is difficult to monitor the diffracted beams at the Fourier plane, the output signal is captured by imaging the back face of the holograms onto the CCD 250.

Figure 9:
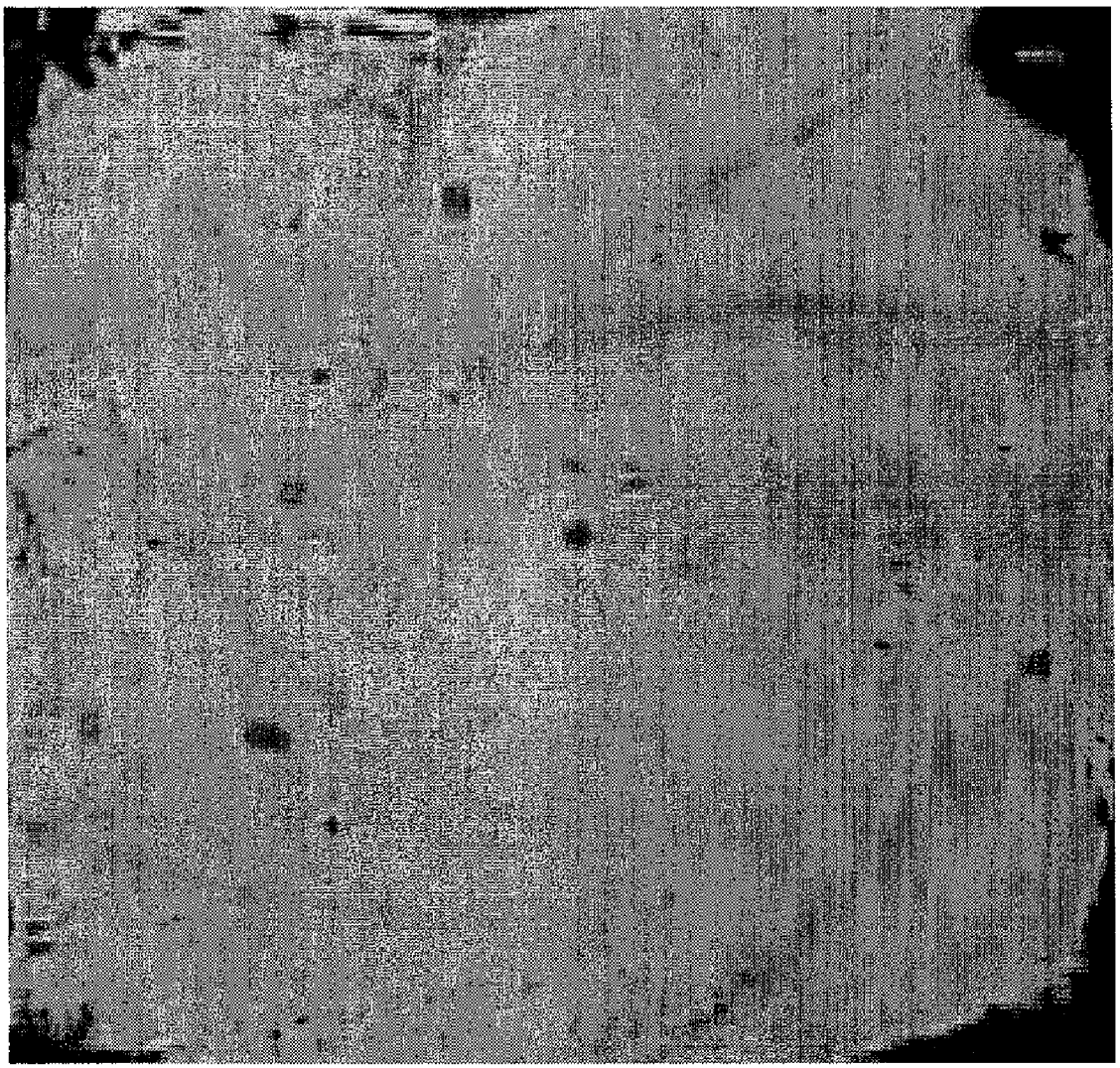
FIG. 9 is a diagram of a diffracted signal of an eight-rotation-multiplexed hologram captured by imaging the back face of the hologram onto a charge coupled detector.

In FIG. 9, eight crescents with a 45 degree rotation respect to each other are obtained. The output pattern (composed of 8 crescents each corresponding to diffraction from one SBVH) has different spatial distributions for different wavelengths. As a result, the spectral diversity and throughput are improved. Furthermore, the performance under diffuse light illumination is also good if thicker material (e.g., 2-mm-thick sample) is used to record the holograms. With the improved selectivity of the thicker material, the clear crescent shape can still be observed at the back face of the holograms. By optimizing both the material properties and the recording parameters, crescents with high diffraction efficiencies and similar properties (same strength and width) can be obtained. Thus, the throughput can be improved without sacrificing the resolution of the spectrometer.

Figure 7:
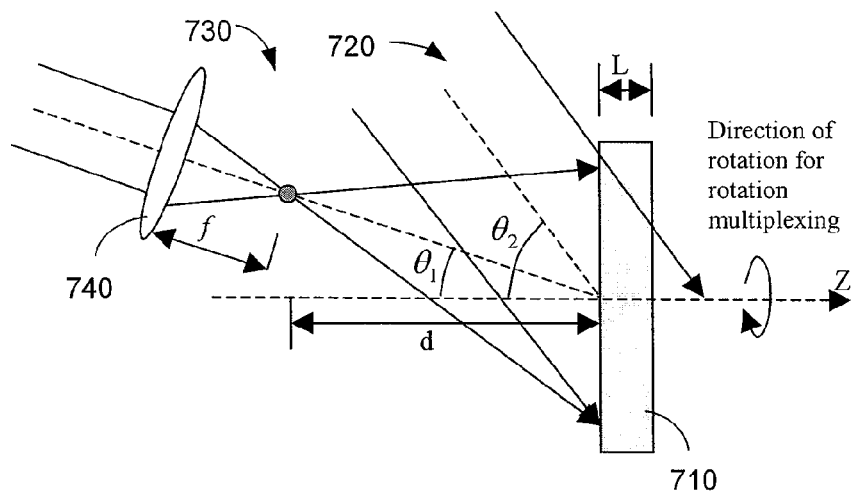
FIG. 7 is a diagram of an exemplary setup for recording rotation multiplexed spherical beam holograms.

In another demonstration, SBVHs are recorded using the set up of FIG. 7. In this example, the recording material 710 is the Aprilis photopolymer with a 200 µm thickness. This is a photopolymer recording medium which uses the cationic ring-opening mechanism. The recording light source 720 is a solid state laser operating at $\lambda=532$ nm, and a plane wave is passed through a lens 740 with f=2.5 cm to make a spherical beam 730. The distance of the focus of the spherical beam to the center of the hologram is d=16 mm.

When measured in air, the angles of the spherical beam axis and the plane wave with respect to the normal axis are $\theta_1=10°$, $\theta_2=46°$, respectively, as shown in FIG. 7. Both beams are transverse electric (TE) polarized (the electric field is perpendicular to the plane of the figure). The size of the hologram is 8 mm by 8 mm. In some embodiments, the distance of the lens 740 is changed with respect to the recording hologram 710 to change the numerical aperture of the spherical beam. Also, the angle of the plane wave using a 4-F optical system (not shown in FIG. 7) may be varied.

Figure 8:
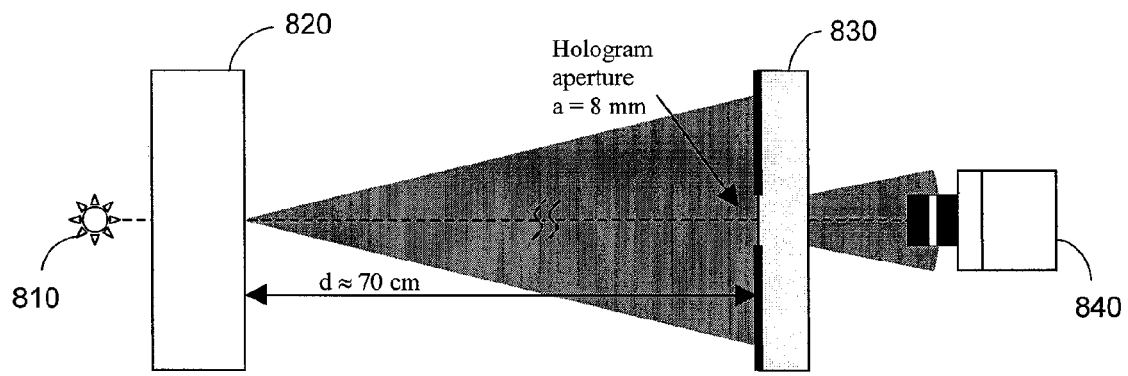
FIG. 8 is a diagram of an exemplary setup for reading and evaluating the transmission of collimated light through holograms recorded by the setup of FIG. 5, 6, or 7.

In the present demonstration, both single holograms and multiplexed holograms are recorded (using rotation multiplexing) in each spot of the recording material 710 to investigate the effect of the complexity of the hologram on its spectral diversity. As previously described, this technique is implemented by means of rotating the sample with respect to the plane containing the center of the spherical beam 730, the center of the recording spot, and a line parallel to the recording plane wave (e.g., rotating the hologram about z-axis in FIG. 7). Parameters include d=16 mm, f=2.5 cm, L=200 µm, $\theta_1=10°$, $\theta_2=46°$, and $\lambda=532$ nm, where the size of the hologram is 8 mm by 8 mm. The hologram is probed using an approximately monochromatic signal generated by passing the light from a regular 50 W light bulb 810 through a monochromator 820, as shown in FIG. 8, for the present case.

The full width half maximum (FWHM) bandwidth of the output light from the monochromator is 8 nm. The hologram is far enough (d 70 cm) from the output slit of the monochromator 820 to approximate a collimated reading beam at the hologram 830. A CCD camera 840 with an imaging lens system is put behind the hologram 830 to capture the image of the transmitted light through the hologram right on the back face of it. The transmission wavelength of the monochromator 820 may be changed and the image of the transmitted light may be grabbed or captured for different wavelengths to observe the spatial-spectral diversity.

Note that the dynamic range parameter (or the M/#) of the recording material limits the number of holograms that can be multiplexed. To obtain good performance, large diffraction efficiency for all holograms is required. The diffraction efficiency (for each hologram) is given by $\eta \sim (M\#/M)^2$, with M being the number of multiplexed holograms. The material used in our experiment has M/#=5. That is why a maximum of M=8 holograms is used in some of the tests so that $\eta$ is close to 50%.

Advantageously, shift multiplexing is a valuable technique to increase the throughput without loosing the resolution of the spectrometer and without increasing the complexity of post signal process. Angular multiplexing and rotating multiplexing are two alternative techniques to improve the throughput and further post reverse signal processing is used to retrieve the spectrum of the unknown input source. Also, a considerable improvement can be achieved by using a recording material with large dynamic range.

By using the high dynamic range of thick holograms, several holograms can be multiplexed resulting in a more distributed signal (e.g. more crescents) for each wavelength channel at the output of the spectrometer. Note that each crescent diffracted from a thicker material has a smaller width (e.g., better resolution but less power). However, a thicker material has a larger M/# allowing for multiplexing more holograms to obtain more crescent (thus, more power) for each wavelength. As a result, the output power per wavelength channel (e.g., throughput) is improved and the increase in resolution does not result in a decrease in the output power as in conventional spectrometers.

By performing an optimization process, the optimal spatial-spectral pattern in the output can be determined. The set of holograms can then be recorded accordingly. In some embodiments, a diffractive optical element may be used to record all holograms simultaneously to optimally use the dynamic range of the recording material.

Embodiments of the present disclosure apply to all holographic multiplexing techniques including shift multiplexing, angular multiplexing, rotation multiplexing and peristrophic multiplexing. For different multiplexing schemes, an especial post-processing algorithm may be utilized to optimize the spectrum estimation.

Figure 10:
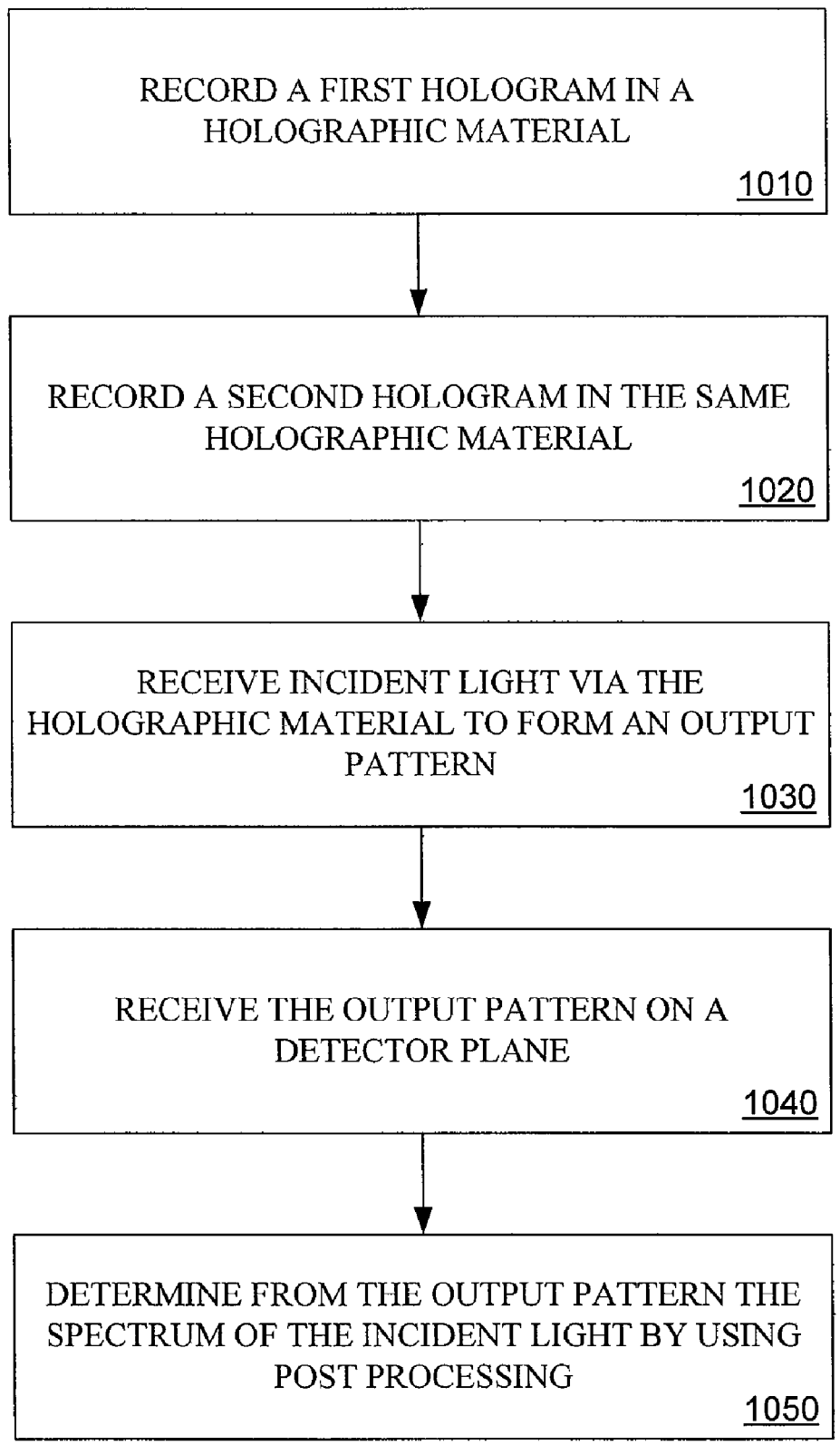
FIG. 10 is a flow chart depicting one embodiment of a process for implementing multimode multiplex spectroscopy using volume holograms.

Referring now to the flow chart of FIG. 10, one embodiment of a process for implementing multimode multiplex spectroscopy is described using volume holograms. First, a first hologram is recorded (1010) in a holographic material. The first hologram is characterized by a first spatial pattern of incident wavelengths in the output plane. Secondly, a second hologram is recorded (1020) in the same holographic material. The second hologram is characterized by a second spatial pattern of incident wavelengths. This process is repeated until all holograms are recorded.

In accordance with the present disclosure, diffractive optical elements may be used in some embodiments to record the holograms. Diffractive optical elements (DOE) are substrates on which microstructures have been patterned (etched, written, copied, etc.) so as to diffract light in a desired manner. By modeling the diffraction process in a computer, it is possible to design elements to diffract light into practically any desired pattern or wavefront that satisfies Maxwell's Equations.

Referring back to the figure, the first and second spatial patterns may overlap with another to some degree, including different wavelengths spatially overlapping. However, the overall pattern is significantly diverse such that individual frequency components may be determined. Accordingly, light is diffracted and received (1030) by the recorded holographic material such that an output pattern of the light is formed. The output pattern is received (1040) on a detector plane. Due to the overlapping patterns of the individual holograms, the output light may have increased power in comparison to that in a single hologram case. Utilizing post processing techniques, the spectrum of the incident light may be determined (1050) from the output pattern.

Next, FIG. 11 describes a flowchart of one embodiment of a method of analyzing an optical spectrum. The method includes the step (1110) of using a sophisticated volume hologram to disperse an incident optical signal with uniform spectrum over an input plane to an output pattern with non-uniform spatial-spectral information. The sophisticated volume hologram comprises a plurality of holograms that map the input wavelengths into diverse spatial patterns in the output. Further, the method includes the step (1120) of receiving and detecting light dispersed by the sophisticated volume hologram. Then, a spectrum of the incident optical signal is determined (1130) from the received and detected light by post processing. Other steps and features previously discussed may also be included in one or more embodiments.

Advantageously, a spectrometer system does not add any complexity by employing holographic SDFs of the present disclosure. All that is needed is to replace a grating previously in use with a volume hologram. While conventional spectrometers could increase throughput by increasing the size of a slit, this causes other problems, including a loss of resolution and alignment issues. Embodiments of the present disclosure can be used for both normal and lens-less Fourier transform holographic spectrometers. Commercially, inexpensive utility spectrometers, in accordance with the present disclosure, may be developed and used in teaching and research laboratories, used for blood alcohol and glucose characterizations or other biological sensing applications, used for characterizing especial hazardous gases in air or in other environmental sensing applications, etc.

Any process descriptions or blocks in flow charts should be understood as possibly including one or more steps in the process. Alternate implementations are included within the scope of present disclosure in which functions may be executed out of order from that shown or discussed, including substantially, concurrently, or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Therefore, having thus described the invention, at least the following is claimed:

1. A system for analyzing an optical spectrum, comprising:
   a sophisticated volume hologram for dispersing an incident optical signal with uniform spectrum over an input plane to an output pattern with non-uniform spatial-spectral information, the sophisticated volume hologram comprising a plurality of holograms that map different input wavelengths into a diverse spatial pattern; and
   a detector for receiving and detecting light dispersed by the sophisticated volume hologram as a single crescent output summation of different crescent signals from each of the plurality of holograms incident at a same location on the detector.

2. The system of claim 1, wherein the plurality of holograms are recorded using a plane wave as one recording beam and a diverging spherical beam formed by using a point source as another recording beam, where the diverging spherical beam shifts its position along an axis parallel to a longitudinal axis of the sophisticated volume hologram.

3. The system of claim 2, wherein the one recording beam comprises a converging spherical beam.

4. The system of claim 1, wherein the sophisticated volume hologram increases intensity of an output pattern of an optical signal received by the sophisticated volume hologram without detrimentally affecting resolution of the output pattern of the optical signal.

5. The system of claim 1, wherein the plurality of holograms are recorded using a plane wave as one recording beam and a diverging spherical wave as another recording beam, where an angle of the plane wave is changed during recording of different holograms.

6. The system of claim 1, wherein the plurality of holograms are recorded using a plane wave as one recording beam and a diverging spherical wave formed by using a point source as another recording beam, where recording material is rotated around an axis normal to the recording material between each recording.

7. The system of claim 2, wherein post processing is performed on the output pattern to determine a spectrum of the incident optical signal.

8. The system of claim 2, wherein diffractive optical elements are used to record the plurality of holograms simultaneously.

9. The system of claim 1, wherein the sophisticated volume hologram has different spatial distributions for different incident wavelengths.

10. A method of analyzing an optical spectrum, comprising the steps of:
    using a sophisticated volume hologram to disperse an incident optical signal with uniform spectrum over an input plane to an output pattern with non-uniform spatial-spectral information, wherein the sophisticated volume hologram comprises a plurality of holograms that map different input wavelengths to diverse spatial patterns in the output pattern; and
    receiving and detecting light dispersed by the sophisticated volume hologram as a single crescent output summation of different crescent signals from each of the plurality of holograms at a same location.

11. The method of claim 10, further comprising the step of:
    producing the sophisticated volume hologram by recording a plurality of holograms using a plane wave as a recording beam and a diverging spherical wave formed by using a point source as a recording beam, wherein the point source for the diverging spherical wave is shifted in position along an axis parallel to a longitudinal axis of the sophisticated volume hologram for which shift selectivity exists.

12. The method of claim 10, wherein the sophisticated hologram is comprised of photopolymer material.

13. The method of claim 10, wherein the sophisticated hologram is comprised of doped glass material.

14. The method of claim 10, wherein the sophisticated hologram is comprised of photorefractive material.

15. The method of claim 10, wherein the sophisticated volume hologram increases intensity of an output pattern of an optical signal received by the sophisticated volume hologram without detrimentally affecting resolution of the output pattern.

16. The method of claim 10, further comprising the step of:
    producing the sophisticated volume hologram by recording the plurality of holograms using a plane wave as one recording beam and a diverging spherical wave as another recording beam, wherein an angle of the plane wave is changed during recording of different holograms.

17. The method of claim 16, further comprising the step of:
    performing post processing on the output pattern to determine a spectrum of the incident optical signal.

18. The method of claim 10, further comprising the step of:
    simultaneously recording the plurality of holograms by using a diffractive optical element.

19. The method of claim 10, further comprising the step of:
    producing the sophisticated volume hologram by recording the plurality of holograms using a plane wave as one recording beam and a diverging spherical wave as another recording beam, wherein recording material is rotated around the normal direction to the recording material between each recording.

20. The method of claim 10, wherein the sophisticated volume hologram has different output spatial distributions for different incident wavelengths.

21. The method of claim 10, further comprising:
    improving throughput of the sophisticated volume hologram by substituting the sophisticated volume hologram ("first sophisticated volume hologram") with a second sophisticated volume hologram having a greater number of holograms than the first sophisticated volume hologram.

* * * * *

UNITED STATES PATENT AND TRADEMARK OFFICE
CERTIFICATE OF CORRECTION

PATENT NO. : 7,649,660 B2
APPLICATION NO. : 11/459102
DATED : January 19, 2010
INVENTOR(S) : Adibi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this

Twenty-third Day of November, 2010

David J. Kappos
*Director of the United States Patent and Trademark Office*